(12) United States Patent
Thoma et al.

(10) Patent No.: US 6,346,059 B1
(45) Date of Patent: Feb. 12, 2002

(54) HYDROSTATIC TRANSAXLES

(75) Inventors: Christian Helmut Thoma; George Duncan McRae Arnold, both of Jersey (GB)

(73) Assignee: Hydro-Thoma Limited, Jersey (GB)

( * ) Notice: Subject to any disclaimer, the term of this patent is extended or adjusted under 35 U.S.C. 154(b) by 0 days.

(21) Appl. No.: 09/550,793

(22) Filed: Apr. 17, 2000

Related U.S. Application Data (62) Division of application No. 09/166,924, filed on Oct. 6, 1998, now Pat. No. 6,076,428.
(60) Provisional application No. 60/061,811, filed on Oct. 14, 1997.

(51) Int. Cl.$^7$ .............................................. F16H 47/04
(52) U.S. Cl. ......................... 475/198; 475/83; 74/606 R
(58) Field of Search .......................... 74/606 R; 60/454, 60/487; 475/83, 198

(56) References Cited

U.S. PATENT DOCUMENTS

| | | | |
|---|---|---|---|
| 4,781,259 A | * 11/1988 | Yamaoka et al. | .......... 74/606 R |
| 4,979,583 A | 12/1990 | Thoma et al. | ................. 180/62 |
| 5,078,659 A | 1/1992 | Von Kaler et al. | ............. 475/78 |
| 5,125,291 A | 6/1992 | Makita et al. | .............. 74/730.1 |
| 5,234,321 A | 8/1993 | Gafvert | ....................... 417/219 |
| 5,289,738 A | * 3/1994 | Szulczewski | .............. 74/606 R |
| 5,768,955 A | 6/1998 | Hauser | ...................... 74/606 R |
| 5,771,758 A | 6/1998 | Hauser | ...................... 74/606 R |
| 5,809,845 A | 9/1998 | Shimizu | .................... 74/606 R |
| 5,979,270 A | 11/1999 | Thoma et al. | ............. 74/606 R |
| 6,076,428 A | * 6/2000 | Thoma et al. | ............. 74/606 R |
| 6,237,332 B1 | * 5/2001 | Thoma et al. | ................. 60/456 |

* cited by examiner

Primary Examiner—Sherry Estremsky
(74) Attorney, Agent, or Firm—Young & Thompson (57) ABSTRACT

An axle assembly for use in lawn tractors, pedestrian walk-behind mowers and snow blowers in the form of a housing having an internally disposed hydrostatic transmission and speed reducing gearing. An input shaft supported in the housing for driving a variable-displacement hydraulic pump of the hydrostatic transmission, the pump fluidly coupled to a fixed-displacement hydraulic motor of the hydrostatic transmission, and where the motor is drivingly connected through the speed reducing gearing to an output axle shaft or shafts. A mechanical differential disposed within said housing for applications requiring differential speeds of said axle output shafts. The housing being formed by three housing members and joined together along a substantially planar and horizontally peripheral seam formed there between such that two of said housing members are to one side of said seam and join with the third housing element. Two internal chambers formed by the three housing elements where one chamber contains the hydrostatic transmission and the other chamber contains the speed reducing gearing. A connecting shaft spanning between the chambers to provide the power transmission link between the hydrostatic transmission and the speed reducing gearing.

24 Claims, 11 Drawing Sheets

HYDROSTATIC TRANSAXLES

CROSS-REFERENCE TO RELATED APPLICATIONS

This application is a division of copending application Ser. No. 09/166,924, filed Oct. 6, 1998 and now Pat. No. 6,076,428, which claimed the benefit of provisional application Serial No. 60/061,811, filed Oct. 14, 1997.

This invention relates to hydrostatic transaxles which are now used in increasing numbers for lawn care and other outdoor duties as the preferred choice for power transmission drive lines in products such as lawn and garden tractors, pedestrian walk-behind mowers and snow blowers.

Hydrostatic transaxles of the type currently sold in the marketplace require careful assembly and service practices in order to avoid certain problems occurring that may result in lower than expected operational life of the product. Hydrostatic transmissions operate most effectively and efficiently when they are constructed with exceedingly small clearances between their reciprocating and sliding elements. The transmission of power by such hydrostatic transmissions has now become widespread and the attendant small fluid leakage loss from the internal pressurised circuit during operation which is inherent with this type of speed changing device is generally considered insignificant as the resulting retardation in vehicle speed most often goes largely unnoticed by the end user. Hydrostatic transmissions work well and have a long and useful life so long as the level of contamination suspended in the power transmission fluid remains low. High levels of contamination carried by the power transmitting fluid can rapidly wear out the aforementioned fine clearances resulting in an increase in fluid leakage, especially during high pressure operation.

It is therefore of paramount importance during both the initial assembly process when the hydrostatic transaxle is built as well as at subsequent service repair intervals, that the possibility of contamination entering the hydrostatic transmission and its surrounding fluid chamber be minimised. In simple terms, the chance for the hydrostatic transmission components being contaminated during handling on the assembly lines in the factory recede as the number of components in the total assembly build is reduced. It follows therefore, that if the hydrostatic transmission could be fully assembled and sealed in the housing prior to the reduction gearing and differential shaft components being added, there would be an advantage.

In the past, because hydrostatic transmissions were of the self-contained bolts in order to separate the unit from the transaxle and replace it with another unit. If on the other hand, a bearing or shaft seal needed to be replaced in the transaxle drive train, such a repair could be easily effected just by disassembly of the transaxle and without disturbing the internal components of the hydrostatic transmission which would stay in-place in their own housing. A typical design of mating to a separate transaxle device is shown in Eaton Corporation U.S. Pat. No. 5,234,321 incorporated herein as reference.

Due to improvement in the art during the past decade or so, the vast majority of hydrostatic transmissions now in use are of the integrated type whereby a common housing is used to surround both the hydrostatic elements as well as the speed reducing gearing (and differential when required), typically as shown in FIGS. 3 through 5 in Thoma et al. U.S. Pat. No. 4,979,583 incorporated herein as reference. Although the improvement of the "integrated" type over the earlier "bolt-on stand-alone" type of hydrostatic transmission and transaxle combination has provided significant economic benefits in terms of lowering manufacturing cost of the drive line such that hydrostatic transmissions are now better able to compete more effectively with mechanical-shift gear transmissions, inconveniences can arise when repairs are needed. The consequence of shipping units back to the factory for repair is both costly and inconvenient for the vehicle owner.

Furthermore, in the event of a service agent electing to make the repair himself, for example, a normally relatively simple repair involving the replacement of a worn bearing or seal, it is at present a fact that this would first necessitate the splitting open of the transaxle housing in order to gain access to those elements needing replacement. As such action results in the hydrostatic transmission components being exposed to what may well be a relatively unclean working environment, a distinct possibility exists that the hydrostatic transmission might have become contaminated such the repair is only short lived. Consequently, the service agent may elect to substitute the faulty unit with a brand new replacement but this has the disadvantage of much additional expense for the vehicle owner, especially if the existing hydrostatic transmission or conversely, the original gear train components were considered by the agent to be in good and still usable condition. There therefore is a need in the art for a new integrated hydrostatic transaxle that will allow simple repairs to be undertaken by the dealership on the non-hydrostatic components without exposing the internally disposed hydrostatic transmission components to contamination.

With all known integrated hydrostatic transaxles currently sold, factory testing can only take place once the transaxle is fully assembled as the hydrostatic portion as well as the geared portion are contained within a surrounding two-piece housing structure. In the event the factory test indicates that the hydrostatic transmission is not operating satisfactorily, repair and rectification can be both costly and time consuming as the complete housing must first be dismantled in order to be able to replace deficient hydrostatic componentry. What is therefore needed in the art a new form of integrated hydrostatic transaxle in which the two types of power transmitting componentry within the complete product package are separate from each other such that the hydrostatic transmission can be tested and approved before the remaining non-hydrostatic components are assembled in place. What is also needed is a new form of integrated hydrostatic transaxle allowing rectification work, when needed, to be speeded up and therefore more economic to perform. What is further needed is a new solution whereby the amount of handing required during assembly on the assembly lines is minimised before the hydrostatic transmission is fully sealed within the surrounding housing structure.

As integrated hydrostatic transaxles of the type currently available in the market require a large housing structure for containing both hydrostatic and non-hydrostatic components, the machine tools needed to perform finish machining operations on the housing are expensive due to their size. There would be a saving in machine tooling investment if the size of transaxle housing were smaller in size, and there would be further saving in terms of economies of scale if one part of the housing structure of the hydrostatic transaxle could be used for numerous other product types. What is therefore needed is a new form of integrated hydrostatic transaxle having a relatively small housing component requiring machining for the mounting of the hydrostatic transmission such that the remaining and larger housing members required for completion of the transaxle housing structure can be used in their as-received die-cast condition. What is further needed is a universal cover housing element for the mounting of the hydrostatic transmission such that the sub-assembly can be used in combination with any number of different case housing elements to satisfy a range of products types.

SUMMARY OF THE INVENTION

From one aspect the invention consists in a housing structure for a hydrostatic transaxle where the housing construction comprising three housing elements that interrelate to form separate chambers for the hydrostatic transmission components and the geared components. An input shaft is supported in the housing and extends into the chamber containing the hydrostatic transmission to drive the hydraulic pump. An output shaft is also supported in the housing and extends into that chamber containing the geared components. In instances when a mechanical differential is also located within the chamber containing the geared components, the output shaft then comprises two shafts that extend from the differential in opposite directions. Within the chamber containing the geared components, the output shaft or shafts is drivingly engaged to the speed reduction gears and where the gears are driven by a connecting shaft that forms the power transmitting link between the hydraulic motor in the hydrostatic chamber and the geared components in the gear chamber.

By this invention, the hydrostatic transmission components for the hydrostatic transaxle can be assembled in a clean room and tested before the complete sub-assembly containing the hydrostatic transmission is dispatched to another location where the non-hydrostatic components are added. As the hydrostatic sub-assembly is sealed by the surrounding housing before entering the final assembly production lines, there is no chance for the hydrostatic transmission to become contaminated when the remaining components are added. In instances when the transaxle manufacturer elects to sub-contract the task of building the complete hydrostatic transmission to an outside agency, the supplied hydrostatic sub-assembly can be received in a ready-to-use condition thereby avoiding any need for the transaxle manufacturer to undertake inspection procedures to ascertain that the received goods are free from contamination from shipping and handling.

It is therefore an object of the invention to provide an improved housing for a hydrostatic transaxle whereby the chamber for the hydrostatic transmission components is segregated from that chamber containing the speed reducing geared components in a manner whereby the hydrostatic transmission can be tested and approved before the remaining assembly involving the geared components takes place. It is a further object of the invention to provide an improved housing for a hydrostatic transaxle whereby the service life of the unit can be extended by allowing simple repairs to be effected in the field without disturbance or disassembly of the hydrostatic transmission components.

What is further needed in the art is a new form of integrated hydrostatic transaxle in which a relatively small housing component structured for carrying the hydrostatic transmission be provided with an ability to resist and absorb within its structure the fluid pressure generated loads by the hydrostatic transmission such that the remaining and larger housing members of the hydrostatic transaxle serve to support the non-hydrostatic loads. It is a further object of the invention to group all the machining operations for the housing structure of the hydrostatic transaxle into said smallest of the three housing elements thereby providing material saving in tooling investment and total machining hours required.

It is a further object of the invention to segregate the hydrostatic transmission from the reduction gearing by providing a case housing element with a substantially planar and horizontally peripheral seam serving as an abutment surface onto which interface two smaller sized container-shaped housing elements whereby the power transmission link connecting the hydrostatic transmission to the reduction gearing has an axis of rotation arranged in parallel relationship with regard to the seam and where the housing elements serve to protect the power transmission link from corrosion or falling debris such as grass chippings which commonly accumulate on the exterior surface of hydrostatic transaxle apparatus.

In one form thereof, the hydrostatic transaxle of the invention comprises an axle assembly having a housing including first, second and third housing elements joined along a substantially planar and horizontally peripheral seam formed there between such that the first and second housing elements are to one side of the seam; the third housing element being provided with first and second cavities and where the first cavity is closed by an opposite cavity provided by the first housing element to define a first chamber. The second cavity is closed by an opposite cavity provided by the second housing element to define a second chamber; a hydrostatic transmission comprising a variable-displacement pump and fixed-displacement motor disposed within the first chamber and speed reducing gearing disposed within the second chamber; at least one outwardly extending output power transmission shaft rotatably mounted in the housing and an input power transmission shaft rotatably mounted in the housing and operatively connected to the pump, the hydraulic motor being operatively connected to the output power transmission shaft by means of the speed reducing gearing, and where a connecting shaft spans across from the first chamber to enter the second chambers to provide the power transmission link between the hydrostatic transmission and the speed reducing gearing.

Although the preferred shaft mounting location shown in this invention for the mechanical drive connection from the hydraulic motor to the projecting axle output is disposed along the seam whereby all three housing elements provide support surfaces in the form of semi-cylindrical pockets, an alternative embodiment is disclosed whereby such support surfaces are disposed fully to one side of the seam. An advantage of this alternative embodiment is that it allows at least one of the three housing elements to have a substantially flat profile at the peripheral seam, for instance the gear housing element, and where this housing element may manufactured in viarious materials such as an aluminum alloy casting; a pressed-steel component or as a simple plastic or nylon moulding.

In the embodiments described below, the fluid pressure generated loads by the hydrostatic transmission are easily absorbed and contained within the smallest of the three housing elements while the power transmission link between the hydraulic motor in the hydrostatic chamber and the geared components in the gear chamber provide hitherto unattainable improvements and savings in terms of assembly and repair practices over the integrated hydrostatic transaxles types presently on the market.

BRIEF DESCRIPTION OF THE DRAWINGS

The above mentioned and other novel features and objects of the invention, and the manner of attaining them, may be performed in various ways and will now be described by way of examples with reference to the accompanying drawings, in which.

The housing for the hydrostatic transaxle 1 can be comprised of at least three housing elements, the main housing element being here called the case 2, the largest of the three housing elements being provided with a mounting face 3 and which surrounds two cavities 4, 5 sunken from the surface. The first cavity 4 provides internal space for the location of the hydrostatic transmission 7 whereas the second cavity 5 provides the space for the location for various elements comprising the speed reducing gearing 6 and mechanical differential 8. A number of semi-circular pockets are also provided on the mounting face to support various shafts and bearings, for instance, pockets 10, 11 for the output transmission shaft, which as shown here comprise two output axle transmission shafts 12, 13.

A transmission cover element 15 and a gearing cover element 16 are attached against the case 2 on this mounting face 3, these covers 15, 16 being attached to the case 2 by screws or bolts. For instance, shown are a series of holes 17 on mounting face 3 of case 2 which are arranged to surround first cavity 4 into which screws 20 engage. A second series of holes 18 are also included on mounting face 3 of case 3 which are arranged to surround second cavity 5 into which screws 21 engage. All such holes 17, 18 are preferably cast as slightly tapered blind holes so that self-threading screws are used transmission cover element 15 and geared cover elements 16 respectively to the case 2.

The mounting face 3 on case 2 is the horizontal peripheral seam that surrounds both the first and second cavities 4,5 and where, in this first embodiment, the axle output transmission shafts 12, 13 have their axis of rotation substantially coincident with the seam. The transmission cover element 15 and gear cover elements 16 abut against the seam/mounting face 3 of the case 2 along a parting plane as shown in FIG. 1.

Figure 1:
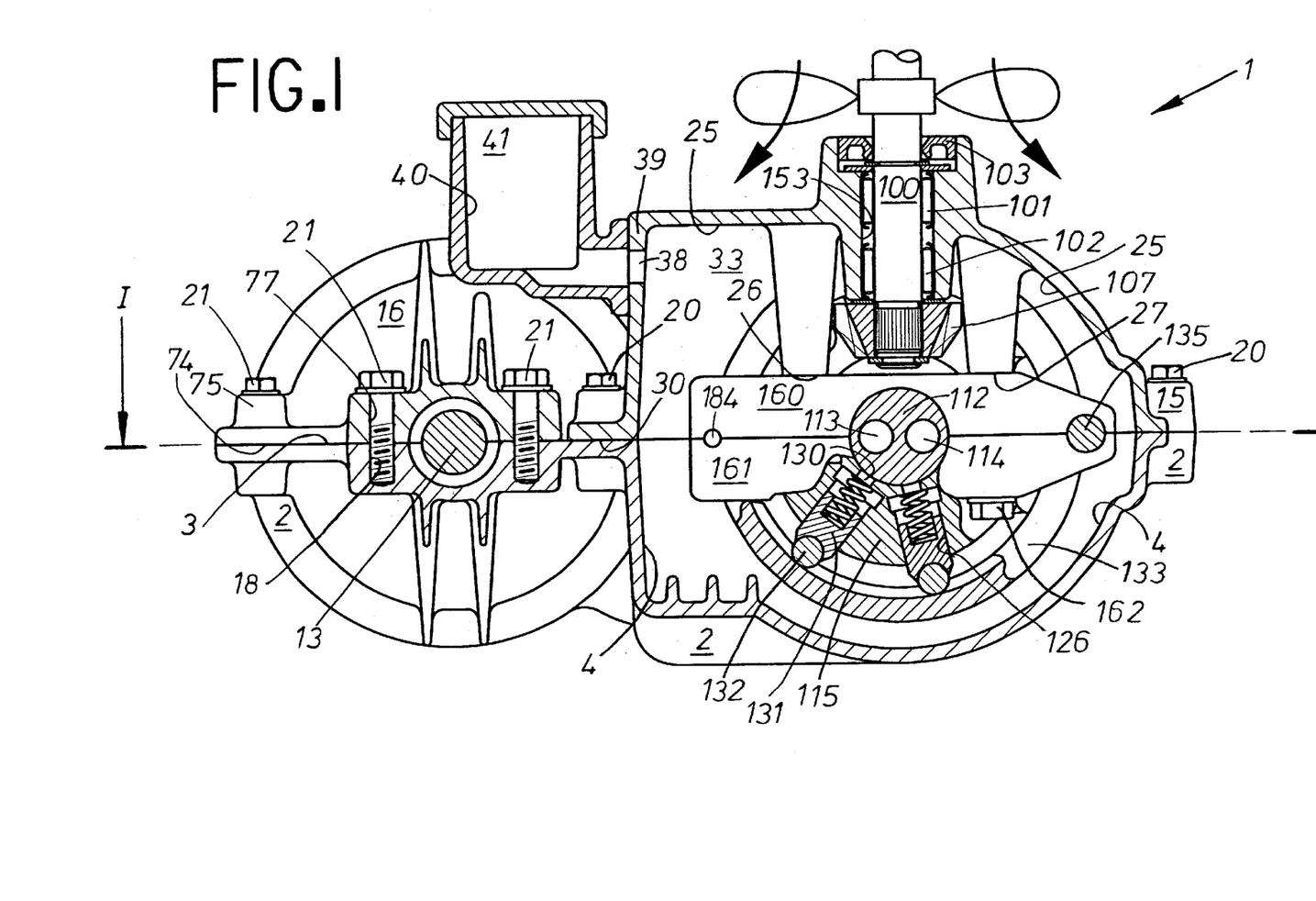
FIG. 1 is a part-sectioned side view of the transaxle according to the invention.
Figure 3:
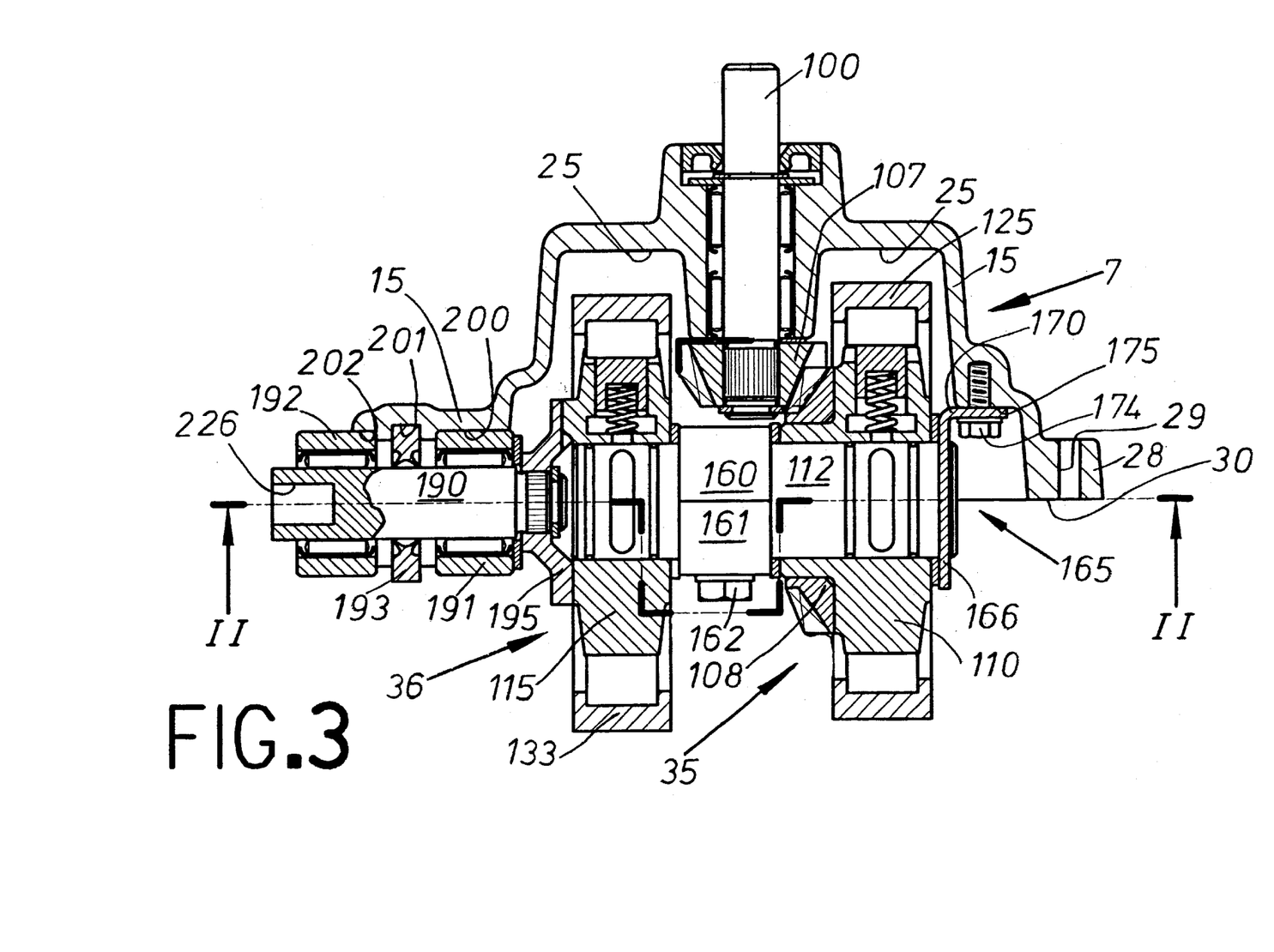
FIG. 3 is a view of the hydrostatic transmission as it is mounted in the transmission cover element according to the invention.

As shown in FIGS. 1 and 3, the shape of the transmission cover element 15 is substantially in the form of a container such that it has a cavity 25 into which a portion of the hydrostatic transmission 7 extends into, and where a number of mounting surfaces are included, such as shown as bosses 26, 27 to which part of the hydrostatic transmission 7 can be attached. Preferably, the hydrostatic transmission is mounted to the cover element 15 rather than to the case element 2 to obtain maximum benefit of this invention, although it could also possible to mount some or all of the hydrostatic transmission components in the case 2, and possibly then the input shaft driving the pump of the hydrostatic transmission would be supported by bearings provided in the case element 2.

As shown, at the open-end of the container of transmission cover element 15, a surrounding radially outwardly extending base flange 28 is provided and where a plurality of holes 29 are included on this flange or lip 28 so that attachment screws 20 can pass through holes 29 and extend beyond its mounting surface 30 and engage with holes 17 provided on the case 2 that surround the first cavity 4. The bottom surface of flange 28 is therefore the mounting surface 30 of the transmission cover element 15 which interfaces with the mounting surface 3 provided on the case 2. At this interface, sealing compound of the anaerobic type is used on the interface so that the internal chamber 33 which is formed by cavities 4, 25 in the case 2 and transmission cover element 15 respectively, into which is housed the hydrostatic transmission 7 and its operating fluid, is separated and protected from the outer exterior environment of the transaxle 1. Internal chamber 33 is flooded with hydraulic fluid which acts as the power transmitting medium for the hydraulic pump 35 and motor 36 of the hydrostatic transmission 7, and where chamber 33 is connected by passage 38 in the vertical wall 39 of transmission cover element 15 so that expansion and contraction of the fluid volume in chamber 33 can take place by spilling the excess amount into an auxiliary chamber 40 provided by header tank 41 here shown attached to the transmission cover element 15.

Figure 2:
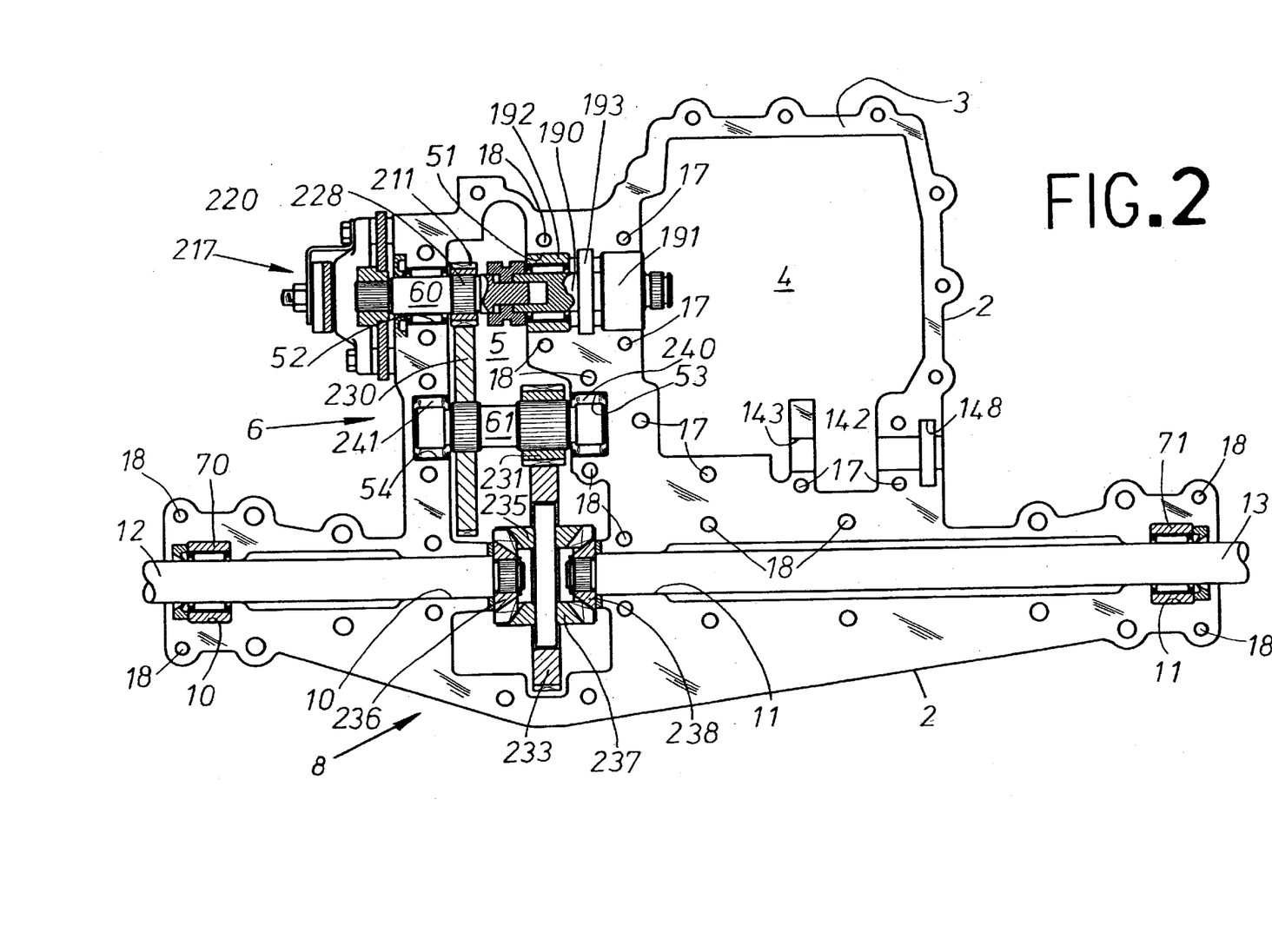
FIG. 2 is a plan view of the case element along the section line I—I of FIG. 1.
Figure 5:
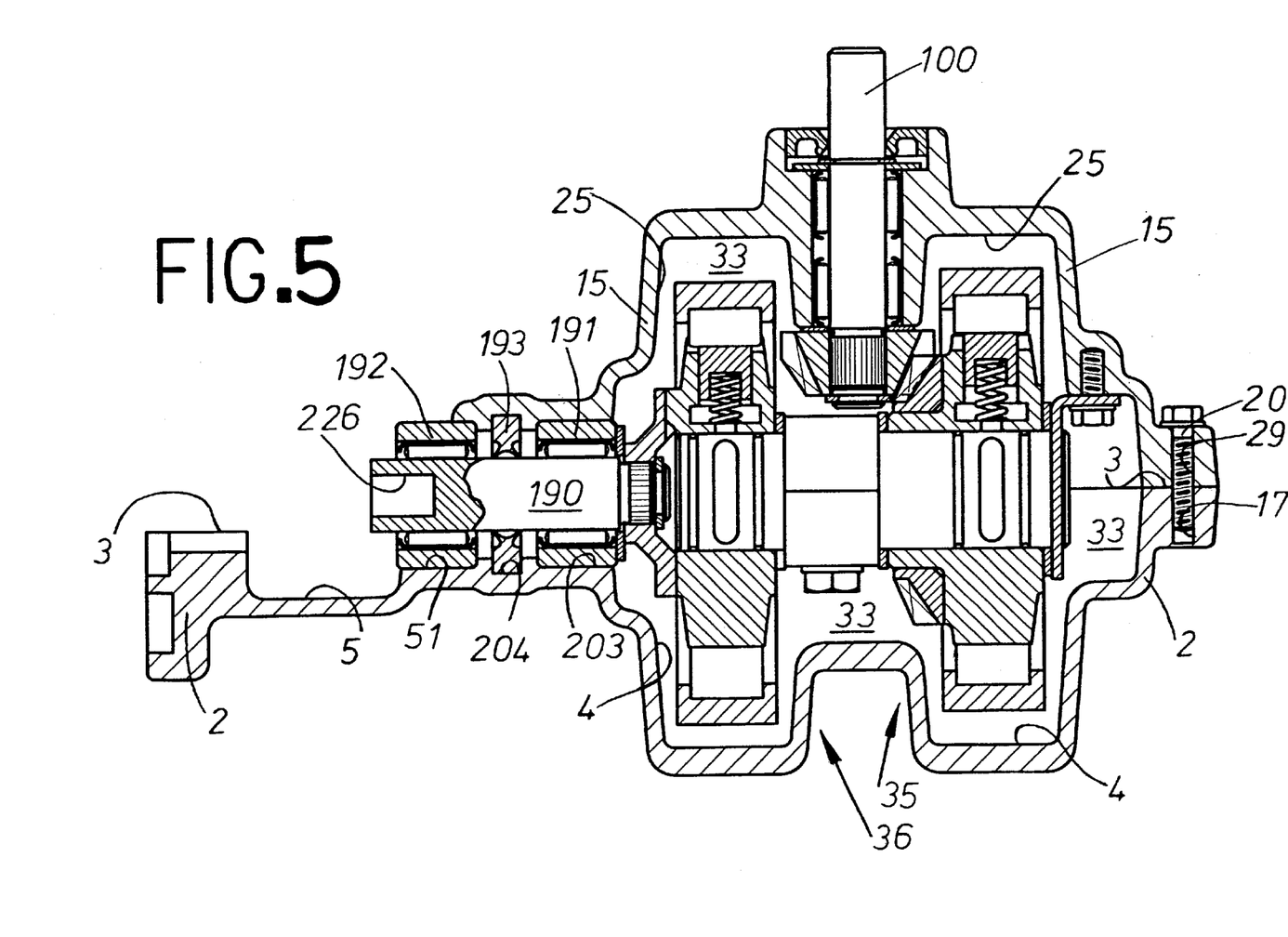
FIG. 5 is a view of the hydrostatic transmission located within the internal chamber formed between the case and the transmission cover element.
Figure 6:
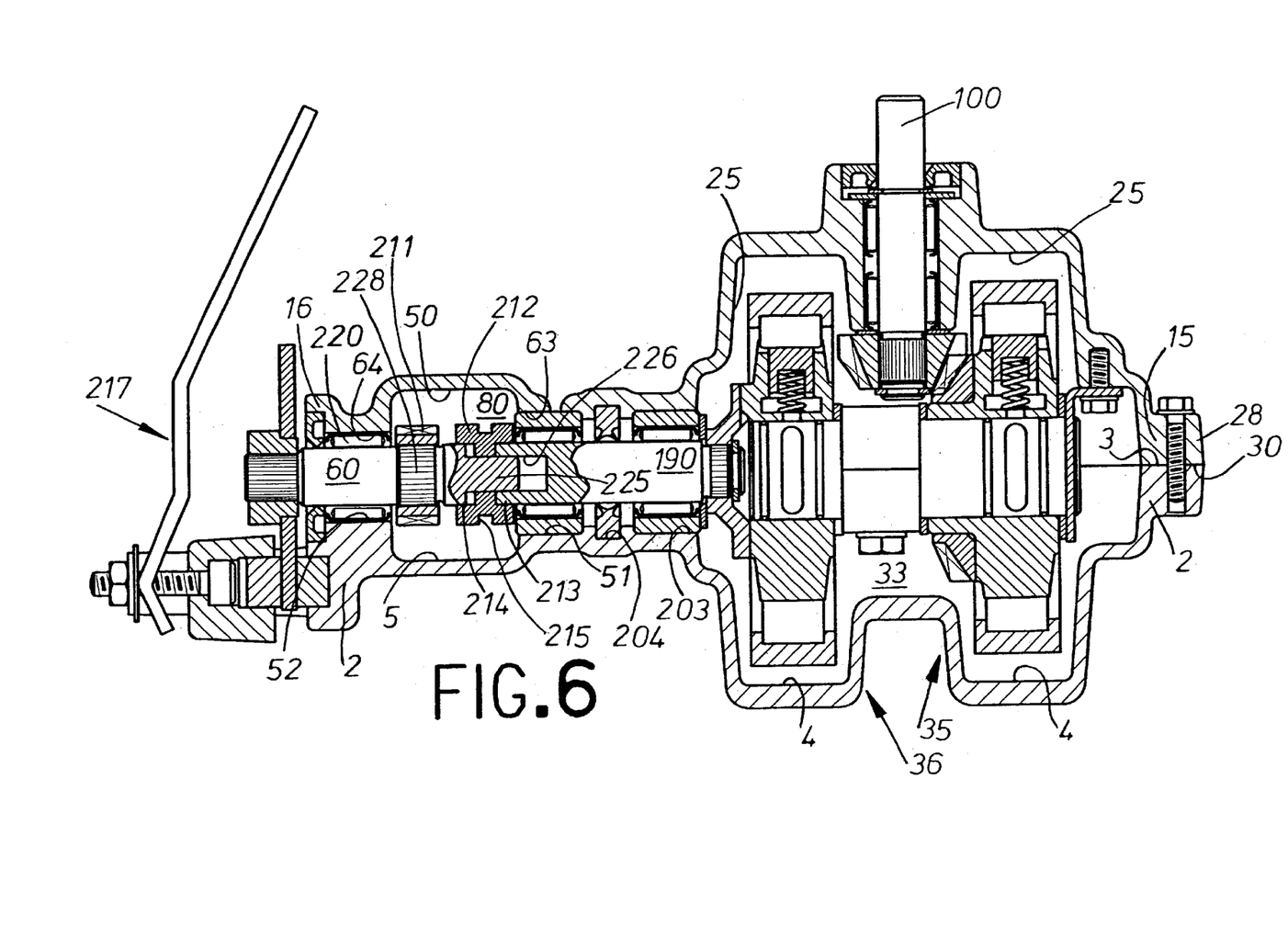
FIG. 6 is a view of the hydrostatic transmission and a portion of the gear reduction located within their respective internal chambers formed between the case and the transmission cover element.
Figure 7:
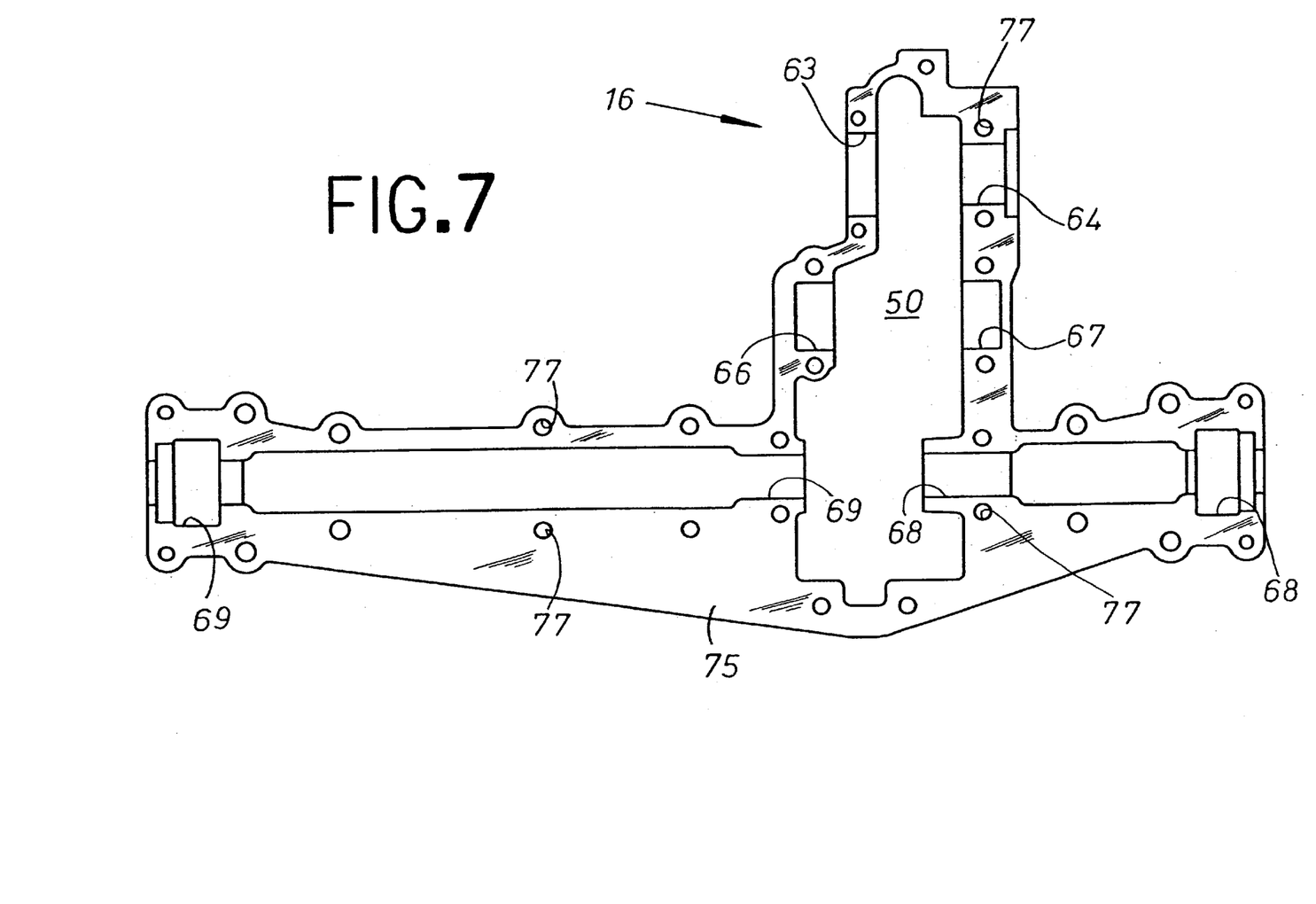
FIG. 7 is a plan view of the gear cover element showing its interior details.

As best shown in FIG. 2, cavity 5 in case element 2 is provided with a number of semi-cylindrical pockets 51, 52, 53, 54 to carry a number of bearings which provide the support for shafts 60, 61 on which various elements of the speed reduction gear train 6 are mounted. Further pockets 203, 204 are provided in case element 2 for the positioning of bearing 191 and seal 193 respectively as shown in FIGS. 5 & 6. The shape of the gear cover element 16 is also generally in the form of a container. FIG. 7 being a plan view and shows it having several semi-cylindrical pockets such as pockets 63, 64 that correspond with pockets 51, 52 in case 2, whereas pockets 66, 67 for intermediary shaft 61 correspond with pockets 53, 54 in case 2. Pockets 68, 69 for axle output shafts 12, 13 correspond with pockets 10, 11 in the case 2, and where bearings 70, 71 are used to support respective shafts 12, 13.

As best seen in FIGS. 1 and 7, surrounding cavity 50 of cover element 16 at the mounting surface 74 is an outwardly radially extending flange 75 where a plurality of holes 77 are included on flange 75 allowing attachment screws 21 to pass through and engage with their corresponding holes 18 provided in case 2 that surround the second cavity 5. The bottom of the flange is therefore the mounting surface of the gear cover element which interfaces with the mounting surface provided in the case 2. At this interface, sealing compound is use so that the internal chamber 80 created by the second cavity 5 in the case 2 and the cavity 50 in the gear cover element 16 is isolated from the exterior of the transaxle 1.

The hydrostatic transmission 7 used to best illustrate the advantages of this invention is preferably mounted to the transmission cover element 15 prior to that element being attached to the case 2. An input shaft supported by bearings 101, 102 in the transmission cover element 15 is operatively connected to the pump of the hydrostatic transaxle 1, and where a rotary shaft seal 103 is fitted about the input shaft 100 is prevent fluid from chamber 33 escaping. Although the input shaft 100 could be arranged to directly drive the pump 35 if so desired or alternatively, input shaft 100 can be operatively connected to the pump 35 by means of gears which may be of the bevel type as is shown or spur gears. Bevel pinion 107 is fixed to shaft 100 and meshes with bevel gear 108 to drive the cylinder-barrel 110 of the pump 35. Bevel gear 108 is fixed to cylinder-barrel 110 of the pump so to rotate at equal speed, and where the barrel 110 is supported for rotation on pintle-valve 112, pintle-valve 112 being provided with internal fluid passages 113, 114 so that fluid from barrel 110 can flow to the cylinder-barrel 115 of the hydraulic motor 36.

Although the form of hydrostatic transmission here used to described the invention is of a type using a radial array of cylindrical rollers, other forms of fluid displacement machines may also be used, for example, those having pistons with slippers or even ball pistons. Furthermore, the hydrostatic transmission as here described has a pump and motor arranged in co-axial back-to-back relationship, but a hydraulic right-angle fluid connection could also be used in which the rotational axes of the pump and motor is perpendicular, and thereby removing the need to include bevel gearing.

Barrel 110 of the pump 35 is provided with a plurality of radially arranged cylinders 117 which are a fixed axial distance relative to the arcuate shaped slots 118, 120 provided on the pintle-valve 112. Each cylinder 117 includes a port 119 which matches with arcuate slots 118, 120 during rotation of barrel 110. Each cylinder 117 receives a piston 122 to which a roller 123 is mounted on its outer end and where the rollers 123 operate against a surrounding annular track-ring 125. The barrel 115 of the hydraulic motor 36 is likewise provided with a plurality of cylinders 126 which are a fixed axial distance relative to the arcuate shaped slots 127, 128 provided on the pintle-valve 112. Each cylinder 126 includes a port 130 which matches with arcuate slots 127, 128 during rotation of barrel 115, and each cylinder 126 receives a piston 131 and a roller 132 is mounted on the outer end of each piston 131 and where the rollers 132 operate against a surrounding annular track-ring 133. In the case of the hydraulic motor 36, track-ring 133 is eccentrically positioned with respect to the pintle-valve 112 whereas in the case of the hydraulic pump 35, track-ring 125 is pivotable about pivot pin 135 . Control-shaft 136 is connected to track-ring 125 by link pins 138, 139 in order that the eccentricity of track-ring 125 can be varied relative to the longitudinal axis of the pintle-valve 112. The control shaft 136 is supported between a pair of semi-cylindrical pockets 140, 141 provided on the mounting surface 30 of the transmission cover element 15 and a complementary pair of pockets 142, 143 provided on the mounting surface 3 of the case 2. A rotary seal 145 is positioned within a further pair of pockets 146, 147 to surround control-shaft 136 and prevent the escape of hydraulic fluid from internal chamber 33.

As shown in FIG. 1, in the interior cavity 25 of the transmission cover element 15, inwardly projecting bosses 26, 27 mounting are spot faced in order to provide a datum and thereby an accurate mounting surface for the hydrostatic transmission 7 . During the same machining operation, the vertical hole 153 is sized for both the shaft bearings 101, 102 and fluid seal 103.

Located in the space between the barrels 110, 115, the pintle-valve 112 and pivot pin 135 are clamped between a two-piece sub-frame 160, 161 which can then be attached by screw 162 to the machined mounting surfaces on the bosses 26, 27. Holes or slots (not shown) in both sub-frame elements 160, 161 allow the passage of these fastening screws 162 which are received into threaded holes provided within the bosses 26, 27 in the transmission cover element 15. When the sub-frame 160, 161 is located onto bosses 26, 27, the action of tightening screws 162 results that sub-frame elements 160, 161 are pressed together while at the same time clamping the pintle-valve 112 and pivot pin 135 in place such that the hydrostatic transmission is fixedly secured against the mounting surface provided in transmission cover element 15.

Figure 4:
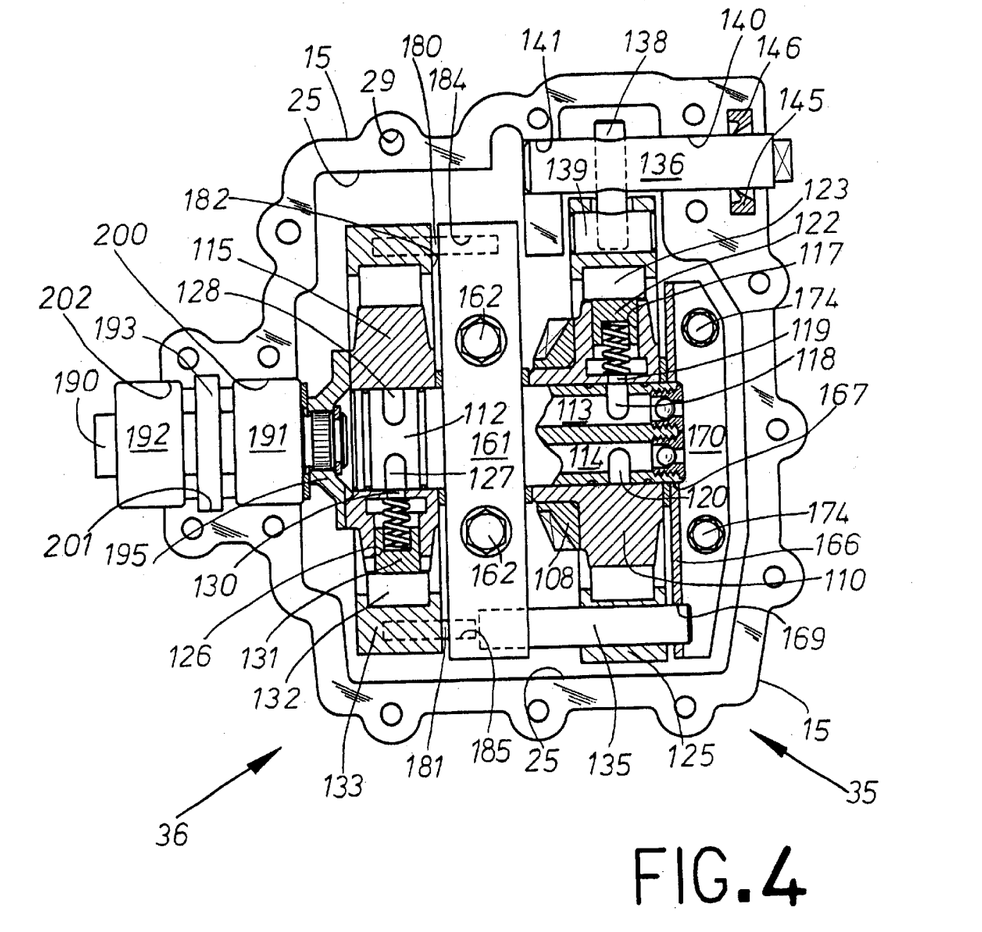
FIG. 4 is a view of the transmission cover element and hydrostatic transmission along the section line II—II of FIG. 4.

A second sub-frame 165 in the form of a pressed steel "L" shaped plate may also be used to secure the hydrostatic transmission to the transmission cover element 15 as shown in FIGS. 3 and 4. One arm shown as 166 of sub-frame 165 is provided with an aperture 167 through which the end of the pintle-valve 112 protrudes through. That portion at end of the pintle-valve 112 which is inserted through aperture 167 might very well be ground with an outer profile conducive to causing the material of arm 166 adjacent to aperture 167 to deform slightly as the end of the pintle-valve is passed through before deforming back to hold tight when it reaches the correct resting place on the pintle-valve. Likewise, a further aperture 169 is included through which the pivot pin 135 protrudes through. The arm or base 170 of sub-frame 165 is provided with two holes (not shown) through which fastening screws 174 pass through, and where the base 170 rests on a machined surface 175 on the interior of the transmission cover element 15. Once screws 174 are tightened, base 170 is fastened to mounting surface 175 and thus, sub-frame 165 and hydrostatic transmission becomes fixedly held to the transmission cover element 15.

As shown in FIG. 4, motor track-ring 133 is attached to the central sub-frame 160, 161 by way of pins 180, 181 that extend from end face 182 of track-ring 133 and engage between respective pairs of pockets shown by dotted lines 184, 185 provided on the interface between sub-frame elements 160, 161. The pins 180, 181 and thereby track-ring 133 become locked in position once screws 162 holding the sub-frame 160, 161 to the mounting surface bosses 26, 27 are tightened.

Therefore, once both sub-frames 160, 161, 165 are fastened to transmission cover element 15, the hydrostatic transmission 7 held in position within chamber 33.

The shaft 190 connecting with the hydraulic motor 36 is built-up as a subassembly with its support bearings 191, 192 and seal 193, and where a drive coupling 195 is used top connect shaft 190 to motor barrel 115. Anaerobic sealant is applied on the surfaces of semi-cylindrical pockets 200, 201, 202 in the transmission cover element 15 before the shaft sub-assembly is moved into position in element 15.

The transmission cover element 15 with its attached hydrostatic transmission 7 is then lowered over cavity 4 in the case 2 as shown in FIG. 5. The mounting surface 3 on the case 2 has anaerobic sealing compound applied, and once in place, the series of screws 20 pass through the holes 29 of the radially extending flange 28 or lip to be engaged into holes 17 in case 2 so that case 2 and cover 15 are tied together as a unitary housing structure. Thus the complete hydrostatic sub-assembly is complete and ready to be tested once transmission fluid has been poured into the internal chamber 33. Once the test is over, the hydrostatic sub-assembly is ready for dispatch so that the remaining gear and other components can be added before the gear cover element 16 and case 2 are locked together by screws 21.

A mechanical disengage mechanism is sometimes useful in hydrostatic transaxles when it is desired to manually push the vehicle without operating the engine that is normally is used to drive the transaxle and propel the vehicle. As here disclosed, this can be easily achieved by having a gear 211 fixedly mounted to a brake shaft 60 in order that a mechanical disengage mechanism can be incorporated between shafts 190, 60.

A collar element 212 is used to connect respective shafts 190, 60 together by means of spline connections 213, 214. Lever means (not shown) act in groove 215 on collar element 212 to shift the collar slightly to the left so that the spline 213 connection is no-longer engaged to motor shaft 190 so that shafts 190, 60 are no-longer connected together to rotate at equal speed. A parking brake 217 attached to shaft 60 ensures the vehicle can be arrested during periods when shafts 190, 60 remain disconnected. Shaft 60 is supported in a bearing 220 seated between semi-cylindrical pockets 52, 64 provided in case 2 and gear cover element 16 respectively, and also journalled at its inner end 225 in a hollow 226 provided in shaft 190.

However, it should be noted that if no mechanical disengage is required, or when an alternative method is used to obtain the same effect, for instance, through the incorporation of a mechanism whereby the fluid in the hydrostatic fluid circuit between the pump and motor is short-circuited, there would be no need to use two shafts such as 60, 190. Instead, a single shaft could be used which would connect the cylinder barrel 115 of the motor 36 to the pinion gear 211 so that power is transmitted from the barrel 115 to the gear 211. In either case however, the shaft or shafts connecting the hydraulic motor 36 to the gear reduction train 6 for the purposes of definition for this invention is called the power transmission link.

Prior to the assembly into the case 2 of the non-hydrostatic elements such as shaft 60, anaerobic sealing compound is applied to the mounting surface 3 as well as to all the semi-cylindrical pockets such as pocket 52. Thus then all the remaining components such as brake-shaft sub-assembly, speed reducing gearing and the differential (when used) together with the output axle shaft or shafts can be lowered into position in the case 2. As depicted, the speed reducing gearing 6 comprises a pinion gear 211 splined 228 to brake shaft 60 which meshes with a gear 230 fixed on an intermediate shaft 61. Intermediate shaft 61 has a further gear 231 fixed to it which meshes with the ring gear 233 that comprises as shown part of the differential unit 8. The differential 8 shown is of the type that has four bevel gears 235, 236, 237, 238, two of which 236, 238 are attached to respective axle output shafts 12, 13 that extend out from the chamber 80. For those applications where there is no requirement to have a differential effect, shafts 12, 13 would in effect be a single shaft. Gear 233 would be modified so to omit bevel gears 235, 236, 237, 238 and be fixed to the output shaft. The output shaft would still protrude from the case 2 and cover 15 on both sides or only on one side to suit the application.

As shown in FIG. 2, bearings 240, 241 are provided for the intermediate shaft 61 which sit in pockets 53, 54 in case 2 and pockets 66, 67 in gear cover element 16.

It is a feature of the invention that both cover elements 15, 16 engage on the same bridging element, the example used to illustrate this being cylindrical bearing member 192, this being accomplished by cylindrical bearing member 192 spanning the semi-cylindrical pockets 202, 63 provided in the otherwise separate cover elements 15, 16. As a result, motor shaft 190 and brake shaft 60 are not exposed to the exterior of the transaxle even though the pairs of cavities 4, 25 and 5, 50 creating respective chambers 33, 80 for the hydrostatic transmission 7 and speed reducing gearing 6 are separate from each other. It should be noted however, especially for instance, were shafts 190, 60 combined into a single shaft, that a rotary seal member could perform as a bridging element in place of a cylindrical bearing member. In that modification, the seal would ideally be pressed into a cylindrical sleeve, and where the sleeve would fit in pockets such as pocket 51 in case 2 and pockets 202, 63 in respective cover element 15, 16. Be the bridging element a seal or a bearing or just an empty sleeve, anaerobic sealant would be smeared at the interface where the bridging element is in engaging contact with the pockets in the housing so that external moisture or contamination is unable to enter chambers 80, 33. For ease and convenience, the outer profile for the bridging element best suited to accomplish the task is cylindrical as depicted but the outer profile could be modified, for instance to being square, and still work.

Therefore, whatever component is chosen to span the gap between the two cover housing elements 15, 16 about the power transmission link between the hydraulic motor portion and the gear portion of the hydrostatic transaxle, the advantage of being able to segregate chambers 33 from 80 from each other as well as issolate said chambers from the external environment of the hydrostatic transaxle is intended to fall within the scope of the claims. Furthermore, it is also intended that this invention cover an arrangement whereby the power transmission link spanning chambers 33, 80 is not protected by any bridging element at all, and where in that arrangement a portion of the connecting shaft or shafts comprising the power transmission link would be exposed to the outer environment of the hydrostatic transaxle. In that respect, provided two rotary seals are applied on the connecting shaft, each seal being located adjacent the interface between respective cover elements and the case element, no contamination can enter chambers 5, 33. If the exposed portion of connecting shaft is lying downward in orientation, then debris and dust is unlikely to collect in the small gap that is likely to exist between the connecting shaft and housing.

Once all the gear train elements are in place, anaerobic sealing compound is applied over those seal and bearing elements which inter-relate with pockets provided in the gear cover element 16. Then gear cover element 16 is placed in position over the cavity 5 of the case 2 before screws 21 are inserted through holes 77 to engage with blind holes 18. Once screws have been tightened, case 2 and gear cover 16 elements are thus firmly together.

To operate the hydrostatic transaxle 1, when track-ring 125 of the pump 35 is moved b) control-shaft 136 into an eccentric position relative to the pintle-valve 112, and during rotation of barrel 110 by the input shaft 100, the pistons 122 reciprocate radially within their respective cylinders 117 and fluid inside the cylinders 117 is displaced through port 119 and flow takes place between arcuate shaped slots 118, 120. The fluid in passages 113, 114 enters the motor 36 through arcuate shaped slots 127, 128 into cylinders 126 in barrel 115 by way of ports 130. The fluid entering each cylinder 126 causes pistons 131 to reciprocate and through the relationship to the eccentrically positioned track-ring 133, and thereby barrel 115 is caused to rotate. Barrel 115 being connected to shaft 190 by coupling 195 cause shafts 190, 60 of the power transmission link to rotate at equal speed, and power is transmitted by gear 211 fixed to shaft 60 to the remaining elements of the speed reducing means 6 for the purpose of torque multiplication to the transmission output shaft or axle shafts 12, 13.

Figure 8:
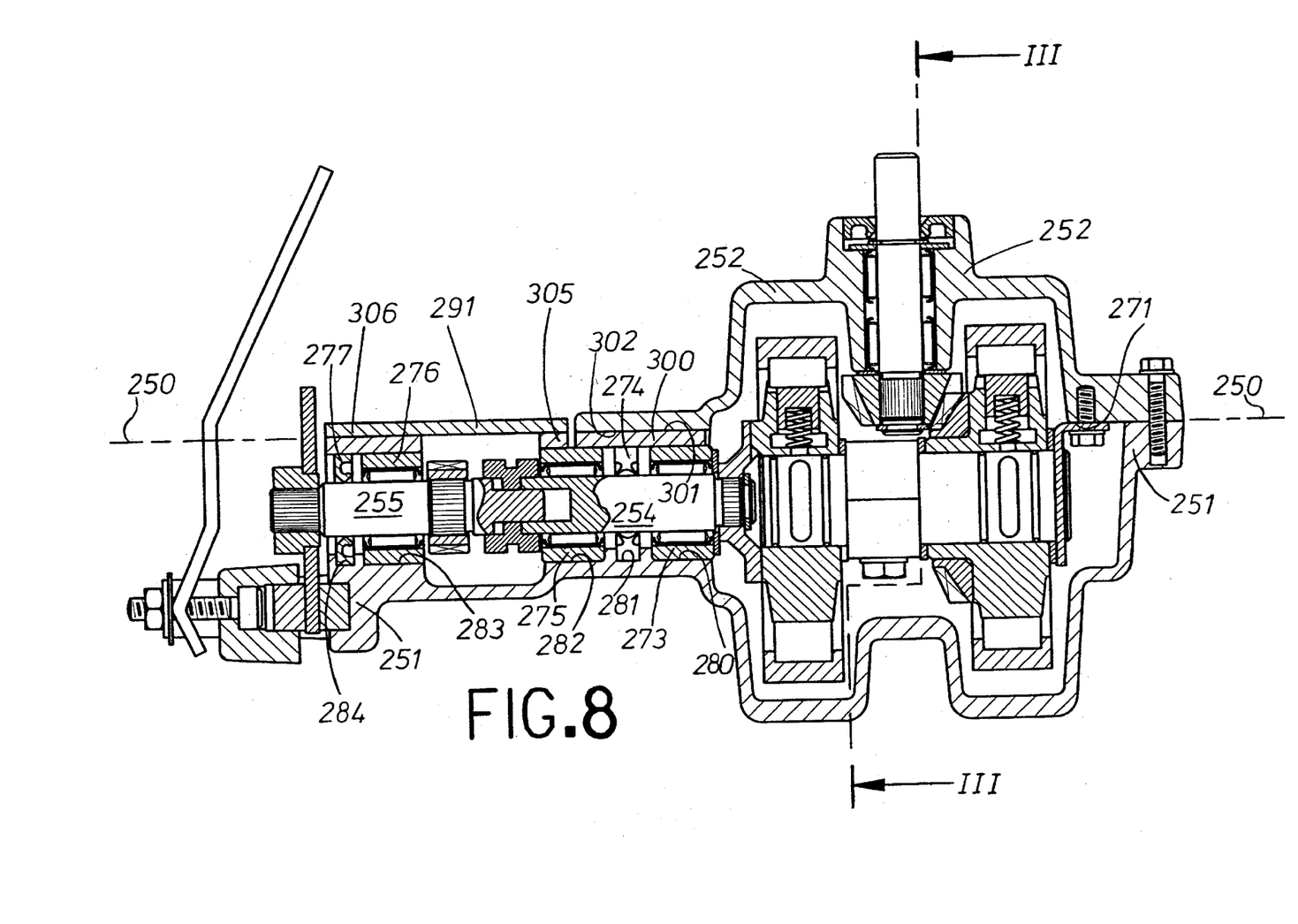
FIG. 8 is a view of the hydrostatic transaxle according to a further embodiment of the invention.
Figure 9:
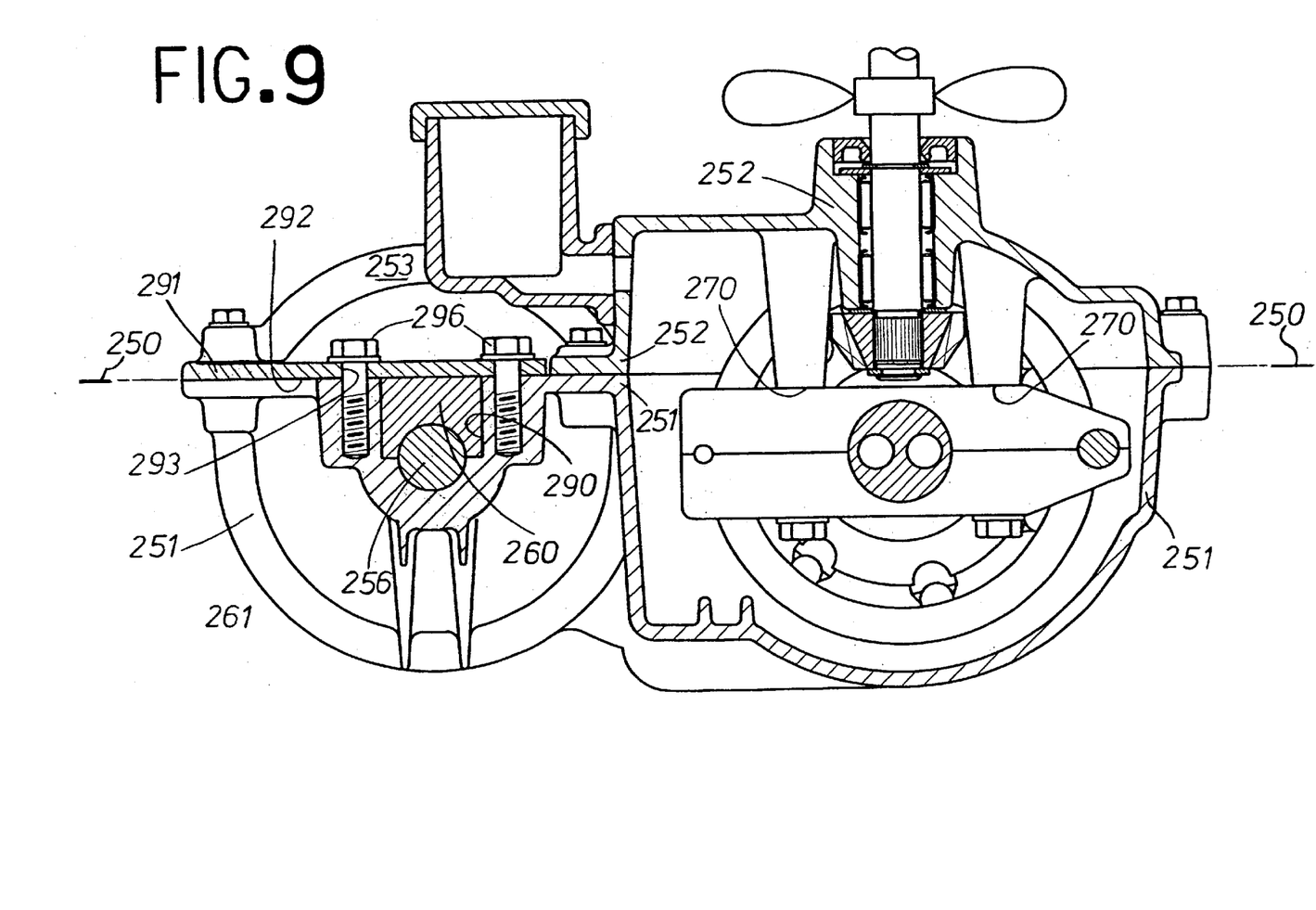
FIG. 9 is a side view of the hydrostatic transaxle along the section line III—III of FIG. 8.
Figure 10:
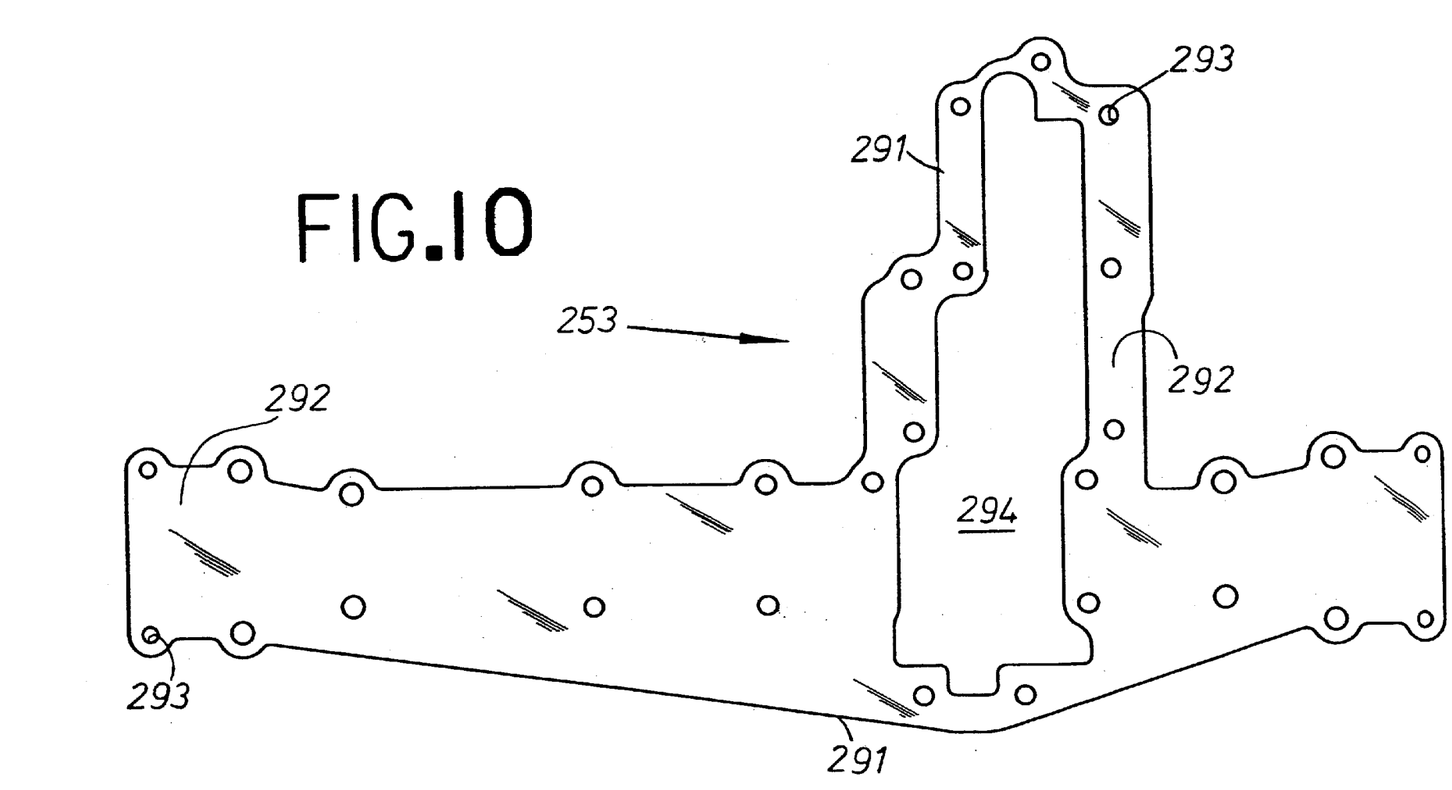
FIG. 10 is a plan interior view of the gear cover element of FIGS. 8 and 9.

In the second embodiment of the invention as shown in FIGS. 8 to 10, the two main difference over what has already been described for the first embodiment is that the rotational axes of the power transmission link as well as the other shafts on the gear reduction compartment are no-longer coincident with the peripheral seam but are now lying offset to one side of the seam; and secondly, the mounting surfaces provided in the housing onto which the hydrostatic transmission components are fixed are now lying on the peripheral seam. The housing structure of the hydrostatic transaxle comprises a main housing case 251 and two smaller housing cover elements, 252, 253. Cover element 252 includes the mounting surfaces 270, 271 for attachment of the hydrostatic transmission components whereas gear cover element 253 is a form a blanking plate with protuberances where necessary.

The axle output shaft(s) 256 and the other shafts required for speed reduction from the hydrostatic transmission such as the power transmission link shafts 254, 255 are here shown located below peripheral seam or parting-plane 250. In this respect, sub-surface bearing carriers, here called inserts are needed such is shown in FIG. 9 by way of example as insert 260. Insert 260 is fitted into a channel as shown 290 provided in the case element 251 and is arranged so that its top surface 261 is level with the peripheral seam 250. The peripheral flat portion 291 of gear cover element 253 that lies directly above the top surface 261 of insert 260 acts to lock and hold insert 260 in place within the channel 290.

Further inserts similar to the type 260 are used for shafts 254, 255 and the intermediary shaft (not shown), shafts 255 being connected to output shaft(s) 256 by the type of gearing already described for the first embodiment.

As shown in FIG. 8, various bearings and seals such as bearings 273, 275, 276 and seals 274, 277 are located within respective semi-cylindrical pockets 280, 282, 283 and 281, 284 provided in the case housing element 251. All these bearings and seals are positioned by inserts so that they are sunken from the surface of the parting-plane 250 to lie in case element 251. For instance, insert 300 is provided for bearings 273, 275 and seal 274, and where the flat top surface 301 of insert 300 abuts with the flat junction surface 302 provided in the transmission cover element 252. Inserts 305, 306 are similarly used, but here they lie between the case element 251 and the flat portion 291 of gear cover element 253.

The gear cover element 253 shown in FIG. 10 can be generally flat in profile about its peripheral seam 292 adjacent to where the mounting holes 293 are located, but includes a central cavity marked as 294 that when viewed from the side, would be bulge shaped to provide thereby room for the various gears and differential that partially extend across the parting plane 250 into cavity 294 when elements 251, 253 become attached together. Screws 296 are shown locking the peripheral flat portion 291 of gear cover element 253 to the case element 251.

As the various shafts such as 254, 255, 256 are now located buried within the structure case element 251 and not withstanding those forces and loads tending in the direction towards the gear cover element 291, the bulk of the mechanical loads are absorbed in the case element 251. Therefore gear cover element 291 is subjected to less loads than in the first embodiment such that for certain light-duty applications can be manufactured as a simple and inexpensive steel pressing or plastic/nylon moulding to thereby provide further worthwhile savings in the overall manufactured cost of the hydrostatic transaxle.

Figure 11:
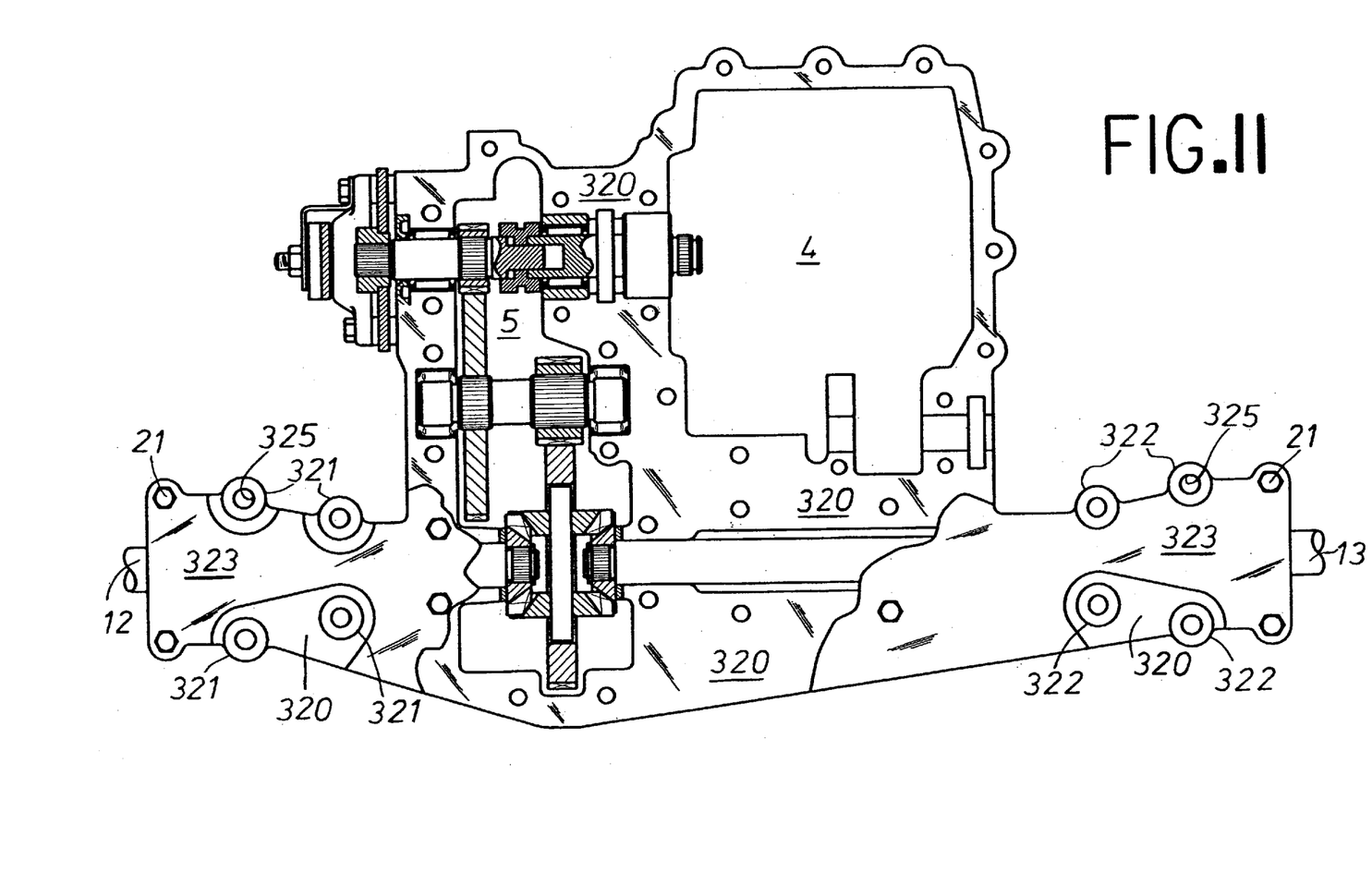
FIG. 11 shows an alternative mounting arrangement on the case for fixing the hydrostatic transaxle to a frame or chassis.

FIG. 11 differs only very slightly from the hydrostatic transaxle shown in the previous embodiments of the invention in order to show that the case element 320 may have groups of upwardly extending external mounting bosses 321 and 322 that extend above the gear cover element 323 adjacent to respective axle output shafts 12, 13. All the bosses contain a through-hole 325 so that the case element 320 can be bolted to the underside frame or chassis of the vehicle.

For many applications, it is most advantageous that the input shaft for the hydrostatic transaxle be located in the transmission cover element as shown in the embodiment here illustrated. However, should it become advantageous to locate the input shaft in what before was depicted as the case element, then the above described embodiments would be adapted so that the hydrostatic transmission is attached to mounting surfaces provided in the case rather then in the transmission cover element. Equally, the hydrostatic transmission and geared components could each be located within two separate cavities provided in a single cover housing element and where now two separate case elements would be used, one case element having a cavity for the hydrostatic transmission and the other case element having a cavity for the geared components. With this re-arrangement of the housing parts, respective pairs of cavities combine to form chambers, one chamber for the hydrostatic transmission and another but distinctly separate chamber for the geared components. In all variations with the housing construction, the power transmission link spanning that chamber containing the hydrostatic transmission to the other chamber containing the reduction gearing and differential would still be needed.

Although a radial piston hydrostatic transmission has been illustrated for the purpose of describing this invention, an axial piston hydrostatic transmission may also be used to good effect. In the axial piston type of hydrostatic machine, the centre section that contains within it the fluid passages connecting the hydraulic pump to the hydraulic motor, by incorporation with this invention be attached to the transmission cover element is a similar manner as the sub-frames here described for the radial piston embodiments. Alternatively, the centre section could be attached near to the bottom surface of the cavity in a case element in a manner whereby a similar transmission cover element and a geared cover element is used in combination with the case as has already been described for the embodiments chosen to best explain the invention. As a further alternative, the axial piston hydrostatic transmission may be mounted to the exposed surface on a cover element having separate cavities for the hydrostatic transmission and gearing elements. In this arrangement the center section would act as the transmission case element by enclosing the cavity in the cover to create the internal chamber for the hydrostatic transmission. In a design having the axial piston form of hydrostatic transmission, it would also be possible to mount the centre section or even the swash-plate of the pump directly adjacent to where the input drive shaft enters the housing structure of the hydrostatic transaxle. However, in all such variations, a power transmission link is required to connect the motor of the hydrostatic transmission in the one chamber to the reduction gearing and differential located in the other chamber.

It is to be understood that while we have illustrated and described various embodiments of our invention, it is not to be limited to any one specific form or arrangement of parts herein described and shown except insofar as such limitations are included in the claims.

What is claimed is:

1. An axle driving assembly comprising a housing constituted by first and second housing elements disposed adjacent one another on one side of a parting plane, and a third housing element disposed on the opposite side of said parting plane and connected to each of said first and second housing elements, said first and third housing elements together defining a first chamber in which a hydrostatic transmission is disposed, and said second and third housing elements together defining a second chamber in which speed reducing gearing is disposed, at least one outwardly extending output power transmission shaft rotatably mounted in said housing and operatively connected to said speed reducing gearing, said hydrostatic transmission and said at least one outwardly extending output power transmission shaft being operatively interconnected by said speed reducing gearing.

2. An axle assembly according to claim 1, wherein said hydrostatic transmission comprises a hydraulic pump fluidly coupled to a hydraulic motor, an input power transmission shaft rotatably mounted in said housing and operatively connected to said hydraulic pump, a connecting shaft rotatably mounted in said housing and arranged to pass from said first chamber to said second chamber for connecting said hydraulic motor to a first gear of said speed reducing gearing.

3. An axle driving assembly according to claim 2, wherein said connecting shaft further comprises a parking brake and a mechanical disengage mechanism, said mechanical disengage mechanism for disconnecting said hydrostatic transmission from said speed reducing gearing when appropriate without rendering said parking brake inoperative.

4. An axle driving assembly according to claim 2 and where the rotational axis of said at least one outwardly extending output power transmission shaft is arranged to be parallel to the axis of rotation of said connecting shaft.

5. An axle driving assembly according to claim 1, wherein said first chamber formed by said first and third housing elements when combined in their assembled condition is in communication with said second chamber formed by said second and third housing elements in their assembled condition by way of a hollow bridging element.

6. An axle assembly according to claim 5, wherein said hydrostatic transmission comprises a hydraulic pump fluidly coupled to a hydraulic motor, an input power transmission shaft rotatably mounted in said housing and operatively connected to said hydraulic pump, a connecting shaft rotatably mounted in said housing and arranged to pass through the interior of said hollow bridging element to connect said hydraulic motor to a first gear of said speed reducing gearing.

7. An axle driving assembly according to claim 5, and including at least one seal member disposed in said housing and lying generally adjacent to said hollow bridging element, said at least one seal member arranged to segregate said first chamber from said second chamber such that the second one of said housing elements can be removed from said third housing element without necessitating the removal of the first one of said housing elements from said third housing element.

8. An axle driving assembly according to claim 1, wherein said housing can be dismantled such that said second chamber is unveiled for the replacement or repair of said speed reducing gearing without said first chamber being unveiled.

9. An axle driving assembly according to claim 1, wherein said first and second housing elements are arranged not to be in direct contact with each other such that either one may be removed from said third housing element while leaving the other one still engaging with said third housing element.

10. An axle driving assembly according to claim 9 wherein a mechanical differential is disposed within said second chamber and drivingly connected between said speed reducing gearing and said at least one outwardly extending output transmission shaft.

11. An axle driving assembly according to claim 1 and including at least one seal member disposed in said housing for the purpose of fluid segregation between first and second chambers.

12. An axle driving assembly according to claim 1 and including a fluid barrier disposed in said housing to substantially prevent contamination generated by said speed reducing gearing within said second chamber from entering said first chamber.

13. An axle driving assembly according to claim 1 wherein independent of said first housing element, said second and third housing elements are provided with interior pockets for the support of at least one shaft carrying said speed reducing gearing.

14. An axle driving assembly according to claim 1 wherein a bevel gear and bevel pinion are disposed within said first chamber for connecting said input shaft to a cylinder-barrel of said hydraulic pump, and where fluid passages are provided in a pintle-valve or equivalent fluid distributor for the transfer of fluid between said hydraulic pump and said hydraulic motor, and where independent of said second housing element said first housing element is provided with an interior mounting surface for said bevel pinion and at least one interior mounting surface to which said pintle-valve is fixedly held.

15. An axle driving assembly according to claim 1 wherein said second housing element is manufactured as a metal pressing.

16. An axle driving assembly according to claim 1 wherein said second housing element is manufactured as a plastic injection moulding.

17. An axle assembly comprising a housing constituted by first and second housing elements disposed adjacent one another on one side of a parting plane, and a third housing element disposed on the opposite side of said parting plane and connected to each of said first and second housing elements, said first and third housing elements together defining a first internal volume in which a hydrostatic transmission is disposed, and said second and third housing elements together defining a second internal volume in which a mechanical differential is disposed, said hydrostatic transmission and said mechanical differential being operatively interconnected via reduction gearing disposed within said housing, and wherein metal particles in said second internal volume are prevented from entering said first internal volume.

18. The axle assembly according to claim 17, wherein said reduction gearing is disposed within said second internal volume.

19. The axle assembly according to claim 17, wherein said first, second and third housing elements, when assembled, form a fluid barrier preventing oil in said first internal volume from entering said second internal volume, and preventing oil in said second internal volume from entering said first internal volume.

20. The axle assembly according to claim 17, wherein said first and third housing elements are joined together at said parting plane.

21. The axle assembly according to claim 17, wherein said second and third housing elements are joined together at said parting plane.

22. The axle assembly according to claim 17, wherein said third housing element is connected to each of said first and second housing elements at said parting plane.

23. The axle assembly according to claim 22, wherein said third housing element comprises a substantially uniplanar junction seam, coincident with said parting plane, for connection to each of said first and second housing elements.

24. An axle assembly comprising a hydrostatic transmission and a mechanical differential disposed adjacent one another in respective chambers formed by a surrounding housing structure, and a bridging element disposed between said chambers, said housing structure including two housing cover elements arranged side by side and each engaging a respective end of said bridging element such that an intermediate portion of said bridging element is exposed exteriorly of said housing structure, said hydrostatic transmission and said mechanical differential being operatively interconnected via reduction gearing disposed within said housing structure, and said bridging element surrounding and shielding a power transmission link comprising at least one shaft passing from said first chamber to said second chamber for the transmission of power between said hydrostatic transmission and said mechanical differential.

* * * * *